United States Patent [19]

Horie et al.

[11] Patent Number: 4,731,315

[45] Date of Patent: Mar. 15, 1988

[54] ELECTROPHOTOGRAPHIC PHOTORECEPTOR CONTAINING A TRISAZO COMPOUND AND A CHARGE TRANSPORT MATERIAL

[75] Inventors: Seiji Horie; Naonori Makino; Hideo Sato, all of Kanagawa, Japan

[73] Assignee: Fuji Photo Film Co., Ltd., Kanagawa, Japan

[21] Appl. No.: 894,534

[22] Filed: Aug. 8, 1986

[30] Foreign Application Priority Data

Aug. 9, 1985 [JP] Japan .................................. 60-175396

[51] Int. Cl.[4] ................................................ G03G 5/06
[52] U.S. Cl. .......................................... 430/77; 430/58
[58] Field of Search ........................ 430/58, 59, 70, 71, 430/72, 73, 74, 75, 76, 77, 78, 79

[56] References Cited

U.S. PATENT DOCUMENTS

| | | | |
|---|---|---|---|
| 4,562,131 | 12/1985 | Sasaki et al. | 430/58 |
| 4,567,124 | 1/1986 | Ohta et al. | 430/79 |
| 4,600,674 | 7/1986 | Emoto et al. | 430/58 |
| 4,619,881 | 10/1986 | Makino et al. | 430/58 |

*Primary Examiner*—John L. Goodrow
*Attorney, Agent, or Firm*—Sughrue, Mion, Zinn, Macpeak, and Seas

[57] ABSTRACT

An electrophotographic photoreceptor is disclosed, comprising a conductive support having provided thereon a light-sensitive layer, wherein said light-sensitive layer contains a specific trisazo compound as a charge generating material and at least one of specific charge transporting materials. The photoreceptor exhibits high sensitivity and durability.

17 Claims, No Drawings

ELECTROPHOTOGRAPHIC PHOTORECEPTOR CONTAINING A TRISAZO COMPOUND AND A CHARGE TRANSPORT MATERIAL

FIELD OF THE INVENTION

This invention relates to an electrophotographic photoreceptor comprising a conductive support having provided thereon an electrophotographic light-sensitive layer containing a charge generating material and a charge transporting material.

BACKGROUND OF THE INVENTION

Photoreceptors in electrophotography are essentially required to satisfy the following performance properties: (1) they can be charged at an appropriate potential in the dark; (2) dark decay is small; (3) they are capable of rapidly discharging upon light irradiation; and the like.

Inorganic substances which have conventionally been used as photoreceptor materials, such as selenium, cadmium sulfide, zinc oxide, etc., certainly have many merits but, at the same time, involve various demerits. For example, selenium which is widely employed for the time being fully satisfies the above requirements (1) to (3) but needs difficult conditions for the production to the ultimate disadvantage of increased production cost. Further, it is difficult to shape selenium to a belt form due to lack of flexibility, and the selenium photoreceptor requires delicate handling due to high sensitiveness to heat or mechanical shocks. Photoreceptors in which cadmium sulfide or zinc oxide is dispersed in a resin binder have mechanical drawbacks in terms of surface smoothness, hardness, tensile strength, abrasion resistance, and the like so that they cannot be used repeatedly as such.

In an attempt of eliminating the above-described disadvantages of inorganic materials, electrophotographic photoreceptors using various organic materials have been proposed recently, and some of them have been turned to practical use. For example, U.S. Pat. No. 3,484,237 discloses a photoreceptor comprising poly-N-carbazole and 2,4,7-trinitrofluoren-9-one; Japanese Patent Publication No. 25658/73 discloses photoreceptors comprising poly-N-vinylcarbazole sensitized with a pyrylium compound; and Japanese Patent Application (OPI) No. 10785/72 describes a photoreceptor comprising mainly an eutectic complex composed of a dye and a resin (the term "OPI" as used herein means a "published unexamined patent application").

Although these organic electrophotographic photoreceptors have somewhat improved mechanical characteristics and flexibility as compared with the above-described inorganic photoreceptors, they are generally insufficient in photosensitivity and unsuitable for repeated use, and, therefore, do not fully satisfy the desired properties for electrophotographic photoreceptors.

In electrophotographic photoreceptors, photoconduction takes place through (1) a process of generating electric charge upon exposure to light and (2) a process of charge transport.

Electrophotographic photoreceptors wherein both the processes (1) and (2) are effected by the same substance include selenium photoreceptors, and those wherein the processes (1) and (2) are separately carried out by different substances include a combination of amorphous selenium and poly-N-vinylcarbazole. The latter technique in which the processes (1) and (2) are effected by different substances advantageously allows a wide choice in the kind of materials to be used, which leads to improvement of electrophotographic characteristics, such as sensitivity of photoreceptors, acceptable potential, etc. Further, such a large choice of materials means that materials favorable to the formation of photoreceptor coating films can be selected from a wide range.

Many proposals for the above-described separate function type electrophotographic photoreceptors have been made, but a very few of them have been turned to practical use, and those that have been used have had some defects.

Moreover, there has been no theory established up to the present in connection with a combination of a charge generating material and a charge transporting material, and each and every combination is studied making trial and error.

SUMMARY OF THE INVENTION

An object of this invention is to provide an electrophotographic photoreceptor excellent in sensitivity and durability.

The present invention relates to an electrophotographic photoreceptor containing a trisazo compound represented by formula (I) as a charge generating material and at least one of compounds represented by one for formulae (II) to (VI) as a charge transporting material.

Formula (I) is represented by

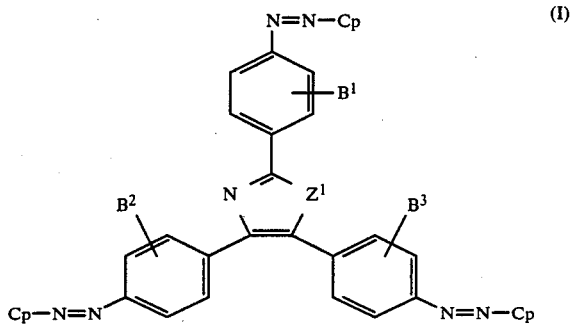
(I)

wherein Cp represents a coupler residue; $Z^1$ represents

—O—, —S—, or —Se—, wherein $R^6$ represents a hydrogen atom, a substituted or unsubstituted lower alkyl group, a substituted or unsubstituted aryl group, a substituted or unsubstituted alkoxycarbonyl group, a substituted or unsubstituted aryloxycarbonyl group, or a substituted or unsubstituted acyl group; and $B^1$, $B^2$, and $B^3$ (which may be the same or different) each represents a hydrogen atom, a halogen atom, a substituted or unsubstituted lower alkyl group, a substituted or unsubstituted lower alkoxy group, a substituted or unsubstituted lower alkoxycarbonyl group, a substituted or unsubstituted aryl group, a substituted or unsubstituted aryloxy group, or a substituted or unsubstituted aryloxycarbonyl group.

Formulae (II) to (VI) are represented by

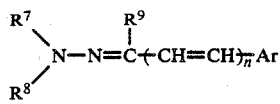
(II)

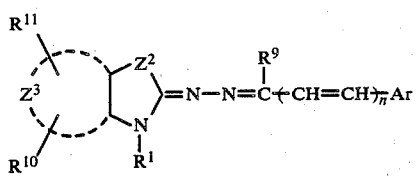
(III)

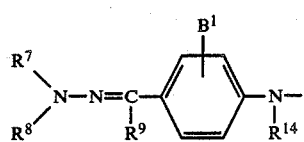
(IV)

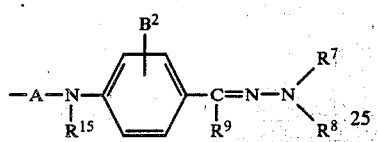

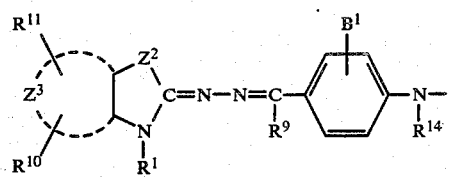
(V)

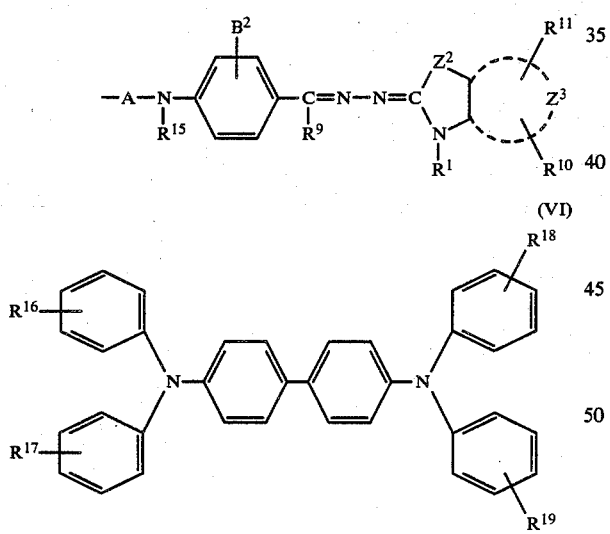
(VI)

wherein $R^7$, $R^8$, $R^{14}$, and $R^{15}$ (which may be the same or different) each represents a substituted or unsubstituted alkyl group, a substituted or unsubstituted aralkyl group or a substituted or unsubstituted aryl group; $R^7$ and $R^8$ may be taken together to form a heterocyclic ring, and $R^{14}$ and $R^{15}$ may be taken together to form an N-containing heterocyclic ring; $R^9$ represents a hydrogen atom, a substituted or unsubstituted alkyl group, or a substituted or unsubstituted aryl group; $B^1$ and $B^2$ are the same as defined in formula (I); $R^1$ represents a substituted or unsubstituted alkyl group or a substituted or unsubstituted phenyl group; $R^{10}$ and $R^{11}$ (which may be the same or different); each represents a hydrogen atom, a halogen atom, a substituted or unsubstituted alkyl group, a substituted or unsubstituted aryl group, a substituted or unsubstituted alkoxy group, a substituted or unsubstituted aralkyloxy group, or a substituted or unsubstituted amino group; $R^{16}$, $R^{17}$, $R^{18}$, and $R^{19}$ (which may be the same or different) each represents a hydrogen atom, a halogen atom, or an alkyl group; Ar represents a substituted or unsubstituted aryl group or a substituted or unsubstituted heterocyclic group; $Z^2$ represents

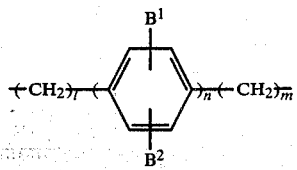

—O—, —S—, —Se—, or a substituted or unsubstituted methine group; $Z^3$ represents an atomic group forming a benzene ring or a naphthalene ring; n represents 0 or 1; and A represents a group of the formula $$-(CH_2)_l-\phantom{X}-(CH_2)_m-$$

wherein l and m represent 0 or an integer of from 1 to 6; n represents 0 or 1; and $B^1$ and $B^2$ are the same as defined for formula (I), or they may be taken together to form a condensed polycyclic aromatic ring.

DETAILED DESCRIPTION OF THE INVENTION

In the above-described formula (I), the coupler residue as represented by Cp is preferably selected from coupler components represented by the formulae

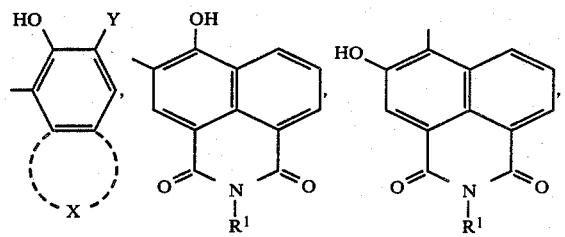

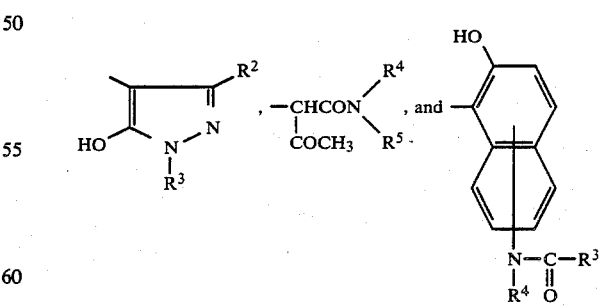

wherein X represents an atomic group forming a substituted or unsubstituted aromatic or heterocyclic ring which is condensed to the benzene ring to which the hydroxyl group and Y are bonded; Y represents a hydrogen atom, —CONR⁴R⁵, —COOR⁴, —CONHNR⁴R⁵, —CONHN=CH—R⁴, or

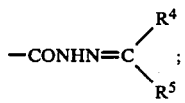

R[1] represents a substituted or unsubstituted alkyl group or a substituted unsubstituted phenyl group; R[2] represents a hydrogen atom, a lower alkyl group, a carbamoyl group, a carboxyl group, an alkoxycarbonyl group, an aryloxycarbonyl group, or a substituted or unsubstituted amino group; R[3] represents a substituted or unsubstituted alkyl group, a substituted or unsubstituted aromatic group, or a substituted or unsubstituted heterocyclic aromatic group; and R[4] and R[5] each represents a hydrogen atom, a substituted or unsubstituted alkyl group, a substituted or unsubstituted aromatic group, or a substituted or unsubstituted heterocyclic aromatic group.

More specifically, X represents a group capable of being condensed to the benzene ring to which the hydroxyl group and Y are bonded to form an aromatic ring, e.g., a naphthalene ring, an anthracene ring, etc., or a heterocyclic ring, e.g., an indole ring, a carbazole ring, a benzocarbazole ring, a dibenzofuran ring, etc.

The aromatic or heterocyclic ring formed by X may be substituted with one or more substituents, which may be the same or different, such as a halogen atom (e.g., a fluorine atom, a chlorine atom, a bromine atom, etc.), a lower alkyl group, preferably having from 1 to 8 carbon atoms (e.g., a methyl group, an ethyl group, a propyl group, a butyl group, an isopropyl group, an isobutyl group, etc.), etc.

R[1] represents a substituted or unsubstituted alkyl group, preferably having from 1 to 12 carbon atoms, or a substituted or unsubstituted phenyl group. Specific examples of the unsubstituted alkyl group include a methyl group, an ethyl group, a propyl group, a butyl group, a pentyl group, a hexyl group, an isopropyl group, an isobutyl group, an isoamyl group, an isohexyl group, a neopentyl group, a t-butyl group, etc.

Substituents for the substituted alkyl group for R[1] include a hydroxyl group, an alkoxy group having from 1 to 12 carbon atoms, a cyano group, an amino group, an alkylamino group having from 1 to 12 carbon atoms, a dialkylamino group having two alkyl groups each having from 1 to 12 carbon atoms, a halogen atom, an aryl group having from 6 to 15 carbon atoms, etc. Specific examples of the substituted alkyl group include a hydroxyalkyl group (e.g., a hydroxymethyl group, a 2-hydroxyethyl group, a 3-hydroxypropyl group, a 2-hydroxypropyl group, etc.), an alkoxyalkyl group (e.g., a methoxymethyl group, a 2-methoxyethyl group, a 3-methoxypropyl group, an ethoxymethyl group, a 2-ethoxyethyl group, etc.), a cyanoalkyl group (e.g., a cyanomethyl group, a 2-cyanoethyl group, etc.), an aminoalkyl group (e.g., an aminomethyl group, a 2-aminoethyl group, a 3-aminopropyl group, etc.), an (alkylamino)alkyl group (e.g., a (methylamino)methyl group, a 2-(methylamino)ethyl group, an (ethylamino)methyl group, etc.), a (dialkylamino)alkyl group (e.g., a (dimethylamino)methyl group, a 2-(dimethylamino)ethyl group, etc.), a halogenoalkyl group (e.g., a fluoromethyl group, a chloromethyl group, a bromomethyl group, etc.) and an aralkyl group (e.g., a benzyl group, a phenethyl group, etc.).

Substituents for the substituted phenyl group for R[1] include a hydroxyl group, an alkoxy group having from 1 to 12 carbon atoms, a cyano group, an amino group, an alkylamino group having from 1 to 12 carbon atoms, a dialkylamino group having two alkyl groups each having from 1 to 12 carbon atoms, a halogen atom, an alkyl group having from 1 to 6 carbon atoms, a nitro group, etc. Specific examples of the substituted phenyl group are a hydroxyphenyl group, an alkoxyphenyl group (e.g., a methoxyphenyl group, an ethoxyphenyl group, etc.), a cyanophenyl group, an aminophenyl group, an (alkylamino)phenyl group (e.g., a (methylamino)phenyl group, an (ethylamino)phenyl group, etc.), a (dialkylamino)phenyl group (e.g., a (dimethylamino)phenyl group, etc.), a halogenophenyl group (e.g., a fluorophenyl group, a chlorophenyl group, a bromophenyl group, etc.), an alkylphenyl group (e.g., a tolyl group, an ethylphenyl group, a cumenyl group, a xylyl group, a mesityl group, etc.), a nitrophenyl group, and phenyl groups having two or more of the above-enumerated substituents, which may be the same or different. The position of the substituent(s) and the positional relation in the case of two or more substituents are not limited.

R[2] preferably represents a hydrogen atom, a lower alkyl group having from 1 to 6 carbon atoms, a carbamoyl group, a carboxyl group, an alkoxycarbonyl group having from 1 to 12 carbon atoms in the alkyl moiety thereof, an aryloxycarbonyl group having from 6 to 20 carbon atoms in the aryloxy moiety thereof or a substituted or unsubstituted amino group.

The substituted amino group for R[2] includes a methylamino group, an ethylamino group, a propylamino group, a phenylamino group, a tolylamino group, a benzylamino group, a phenethylamino group, a dimethylamino group, a diethylamino group, a diphenylamino group, etc.

The lower alkyl group for R[2] specifically includes a methyl group, an ethyl group, a propyl group, a butyl group, an isopropyl group, an isobutyl group, etc.

The alkoxycarbonyl group for R[2] specifically includes a methoxycarbonyl group, an ethoxycarbonyl group, a propoxycarbonyl group, a butoxycarbonyl group, an isopropoxycarbonyl group, a benzyloxycarbonyl group, etc.

The aryloxycarbonyl group for R[2] specifically includes a phenoxycarbonyl group, a toluoxycarbonyl group, etc.

R[3] and R[5] each preferably represents a substituted or unsubstituted alkyl group having from 1 to 20 carbon atoms, a substituted or unsubstituted aromatic group (e.g., a phenyl group, a naphthyl group, etc.) or a substituted or unsubstituted heterocyclic aromatic group containing an oxygen atom, a nitrogen atom, a sulfur atom, etc. (e.g., a dibenzofuranyl group, a carbazolyl group, a benzocarbazolyl group, etc.).

The substituted or unsubstituted alkyl groups for R[3] or R[5] include the same specific groups as enumerated for R[1].

Substituents for the substituted aromatic group (e.g., a substituted naphthyl group) or the substituted heterocyclic aromatic group containing a hetero atom (e.g., a substituted dibenzofuranyl group, a substituted carbazolyl group) for R[3] or R[5] include a hydroxyl group, a cyano group, a nitro group, a halogen atom (e.g., a fluorine atom, a chlorine atom, a bromine atom, etc.), an alkyl group having from 1 to 12 carbon atoms (e.g., a methyl group, an ethyl group, a propyl group, an isopropyl group, etc.), a perfluoroalkyl group having from 1 to 12 carbon atoms (e.g., a trifluoromethyl group, a pentafluoroethyl group, a perfluorobutyl group, a perfluorohexyl group, etc.), an alkoxy group having from 1 to 12 carbon atoms (e.g., a methoxy group, an ethoxy group, a propoxy group, a butoxy group, a pentyloxy group, an isopropoxy group, an isobutoxy group, an isoamyloxy group, a t-butoxy group, a neopentyloxy group, etc.), an amino group, an alkylamino group having from 1 to 12 carbon atoms (e.g., a methylamino group, an ethylamino group, a propylamino group, etc.), a dialkylamino group having from 1 to 12 carbon atoms in each alkyl group moiety (e.g., a dimethylamino group, etc.), an arylamino group having from 6 to 12 carbon atoms (e.g., a phenylamino group, a tolylamino group, etc.), a diarylamino group having from 6 to 15 carbon atoms in each aryl moiety (e.g., a diphenylamino group, etc.), a carboxyl group, an alkali metal carboxylate group (the alkali metal (cation) includes $Na^+K^+Li^+$, etc.), an alkali metal sulfonate group (the alkali metal (cation) includes $Na^+$, $K^+$, $Li^+$, etc.), an alkylcarbonyl group (e.g., an acetyl group, a propionyl group, a benzylcarbonyl group, etc.), an arylcarbonyl group having from 6 to 12 carbon atoms in the aryl moiety thereof (e.g., a benzoyl group, a toluoyl group, etc.), an alkylthio group having from 1 to 12 carbon atoms (e.g., a methylthio group, an ethylthio group, etc.), and an arylthio group having from 1 to 12 carbon atoms (e.g., a phenylthio group, a tolylthio group, etc.). The number of the substituents is from 1 to 3. When 2 or 3 substituents are bonded, they may be the same or different. The position of the substituent(s) is not limited.

$R^4$ represents a hydrogen atom, a substituted or unsubstituted alkyl group having from 1 to 20 carbon atoms, a substituted or unsubstituted aromatic group (e.g., a phenyl group, a naphthyl group, etc.), or a substituted or unsubstituted heterocyclic aromatic group containing an oxygen atom, a nitrogen atom or a sulfur atom (e.g., a dibenzofuranyl group, a carbazolyl group, a benzocarbazolyl group, etc.).

Specific examples of the substituted or unsubstituted alkyl group, substituted or unsubstituted aromatic group or substituted or unsubstituted heterocyclic aromatic group for $R^4$ include those enumerated for $R^3$ and $R^5$.

When Cp represents

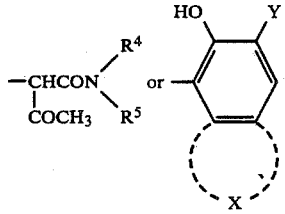

wherein Y represents $-CONR^4R^5$, $-CONHNR^4R^5$, or

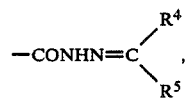

$R^4$ and $R^5$ may jointly form a ring together with the adjacent nitrogen atom or carbon atom. Specific examples of such a ring include a pyrrolidine ring, a piperidine ring, a morpholine ring, a cyclopentane ring, and a cyclohexane ring.

$Z^1$ in formula (I) represents

$-O-$, $-S-$, or $-Se-$.

$R^6$ preferably represents a hydrogen atom, a substituted or unsubstituted alkyl group having from 1 to 6 carbon atoms, a substituted or unsubstituted aryl group having from 6 to 20 carbon atoms, a substituted or unsubstituted alkoxycarbonyl group having from 1 to 12 carbon atoms in the alkoxy moiety thereof, a substituted or unsubstituted aryloxycarbonyl group having from 6 to 20 carbon atoms in the aryloxy moiety thereof, or a substituted or unsubstituted acyl group having from 1 to 20 carbon atoms.

The unsubstituted alkyl group for $R^6$ specifically includes a methyl group, an ethyl group, a propyl group, a butyl group, a pentyl group, a hexyl group, an isopropyl group, an isobutyl group, an isohexyl group, a neopentyl group, a t-butyl group, etc.

Specific examples of the substituted alkyl group or substituted aryl group for $R^6$ are the same as enumerated for $R^1$.

The unsubstituted alkoxycarbonyl group for $R^6$ includes a methoxycarbonyl group, an ethoxycarbonyl group, a propoxycarbonyl group, a butoxycarbonyl group, a benzyloxycarbonyl group, etc.

The unsubstituted aryl group and the unsubstituted aryloxycarbonyl group for $R^6$ include a phenyl group, a naphthyl group, a pyridyl group, a phenoxycarbonyl group, a naphthoxycarbonyl group, etc.

The unsubstituted acyl group for $R^6$ includes an acetyl group, a propionyl group, a benzoyl group, a naphthoyl group, a nicotinoyl group, etc.

The substituents of the substituted alkoxycarbonyl group, substituted aryloxycarbonyl group and substituted acyl group for $R^6$ include the same specific examples as enumerated for $R^1$. The number of the substituents is from 1 to 3. When 2 or 3 substituents are bonded, they may be the same or different. The position of the substituent(s) is not limited.

$B^1$, $B^2$, and $B^3$ each preferably represents a hydrogen atom, a halogen atom (e.g., a chlorine atom, a bromine atom, an iodine atom), a substituted or unsubstituted alkyl group having from 1 to 6 carbon atoms, a substituted or unsubstituted alkoxy group having from 1 to 6 carbon atoms, a substituted or unsubstituted alkoxycarbonyl group having from 1 to 6 carbon atoms, a substituted or unsubstituted aryl group having from 6 to 15 carbon atoms, a substituted or unsubstituted aryloxy group, or a substituted or unsubstituted aryloxycarbonyl group having from 6 to 15 carbon atoms.

The alkyl or aryl moiety in the substituted or unsubstituted alkyl, alkoxy, alkoxycarbonyl, aryl, aryloxy, or aryloxycarbonyl group for $B^1$, $B^2$, or $B^3$ includes the same specific examples as enumerated for $R^6$.

Preferred among the above-described coupler residues as represented by Cp is the formula

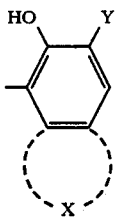

from the standpoint of photosensitivity of the resulting light-sensitive layer and availability of the starting compound.

The more preferred among the coupler residues of the above formula are those wherein X represents a benzene ring, a carbazole ring, or a dibenzofuran ring; and Y represents

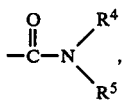

wherein one of $R^4$ and $R^5$ preferably represents a hydrogen atom with the other representing a substituted phenyl group.

The substituents for the substituted phenyl group for $R^4$ or $R^5$ preferably includes an alkyl group, e.g., a methyl group, an ethyl group, etc., a halogen atom, e.g., a fluorine atom, a chlorine atom, a bromine atom, etc., an alkoxy group, e.g., a methoxy group, an ethoxy group, etc., and a perfluoroalkyl group, e.g., a trifluoromethyl group, with a trifluoromethyl group or a combination of a trifluoromethyl group and a halogen atom being more preferred.

The compounds represented by formulae (II) to (VI) will be described below in detail.

$R^7$, $R^8$, $R^{14}$, and $R^{15}$ each preferably represents a substituted or unsubstituted alkyl group having from 1 to 12 carbon atoms, a substituted or unsubstituted aralkyl group having from 7 to 20 carbon atoms, or a substituted or unsubstituted aryl group having from 7 to 20 carbon atoms.

Specific examples of the substituted or unsubstituted alkyl group for $R^7$, $R^8$, $R^{14}$, or $R^{15}$ are the same as those enumerated for $R^1$.

Specific examples of the unsubstituted aralkyl group include a benzyl group, a phenethyl group, a 1-naphthylmethyl group, a 2-naphthylmethyl group, a 1-anthrylmethyl group and a benzhydryl group. Specific examples of the substituted aralkyl group are those having at least one of the substituents recited for the substituted alkyl group for $R^1$.

Specific examples of the unsubstituted aryl group for $R^7$, $R^8$, $R^{14}$, or $R^{15}$ include a phenyl group, a 1-naphthyl group, a 2-naphthyl group, an anthryl group, a pyrenyl group and an acenaphthenyl group. Specific examples of the substituted aryl group are those having at least one of the substituents recited for the substituted alkyl group for $R^1$ and an alkyl group, e.g., a methyl group, an ethyl group, a propyl group, a butyl group, a pentyl group, an isopropyl group, an isobutyl group, and an isopentyl group.

Examples of the heterocyclic ring formed by $R^7$ and $R^8$ include a fluorenyl group. Examples of the N-containing heterocyclic group formed by $R^{14}$ and $R^{15}$ include a piperazinyl group.

It is preferable that one of $R^7$ and $R^8$ represents a phenyl group, and the other represents a methyl, ethyl, benzyl, phenyl, or naphthyl group.

$R^9$ preferably represents a hydrogen atom, an alkyl group having from 1 to 4 carbon atoms (e.g., a methyl group, an ethyl group, a propyl group, a butyl group, etc.), a phenyl group, or a phenyl group having at least one of the substituents recited for the substituted phenyl group for $R^1$.

$R^{10}$ and $R^{11}$ each preferably represents a hydrogen atom, a halogen atom (e.g., a chlorine atom, a bromine atom, a fluorine atom, etc.), an alkoxy group having from 1 to 12 carbon atoms (e.g., a methoxy group, an ethoxy group, a propoxy group, a butoxy group, an octyl group, a benzyloxy group, etc.), an aralkyloxy group having from 1 to 12 carbon atoms (e.g., a benzyloxy group, a phenethyloxy group, etc.), a substituted or unsubstituted alkyl group, or a substituted or unsubstituted phenyl group. Specific examples of the substituted or unsubstituted alkyl group or substituted or unsubstituted phenyl group are the same as enumerated for $R^1$.

Ar preferably represents an aryl group, e.g., a phenyl group, a napthyl group, an anthryl group, etc., or a heterocyclic group, e.g., a 2-furyl group, a 2-thienyl group, a 1-methyl-2-pyrrolyl group, a 5-methyl-2-thienyl group, a 2-pyridyl group, a 2-benzo[b]thienyl group, a 2-naphtho[2,3-b]thienyl group, a 9-ethylcarbazol-2-yl group, a dibenzothiophen-2-yl group, a 2-phenoxathienyl group, a 10-ethylphenoxazin-3-yl group, a 10-ethylphenothiazin-3-yl group, etc.

These aryl or heterocyclic groups may have substituents, such as an alkyl group having from 1 to 12 carbon atoms (e.g., a methyl group, an ethyl group, a propyl group, a butyl group, a hexyl group, etc.), an alkoxy group having from 1 to 12 carbon atoms (e.g., a methoxy group, an ethoxy group, a propoxy group, a butoxy group, an octyloxy group, etc.), an aralkyloxy group having from 1 to 12 carbon atoms (e.g., a benzyloxy group, etc.), and a substituted amino group represented by the formula of

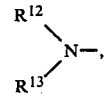

wherein $R^{12}$ and $R^{13}$ each represents an alkyl group having from 1 to 12 carbon atoms, e.g., a methyl group, an ethyl group, a propyl group, a butyl group, etc., or a substituted alkyl group having from 1 to 12 carbon atoms, or a substituted or unsubstituted phenyl group, or $R^{12}$ and $R^{13}$ may be taken together to form a heterocyclic ring.

The substituents for the substituted alkyl group for $R^{12}$ or $R_{13}$ include an alkoxy group having from 1 to 4 carbon atoms, an aryloxy group having from 6 to 12 carbon atoms, a hydroxyl group, an aryl group having from 6 to 12 carbon atoms, a cyano group, and a halogen atom.

Specific examples of the substituted alkyl group for $R^{12}$ or $R^{13}$ are an alkoxyalkyl group (e.g., a methoxymethyl group, a methoxyethyl group, an ethoxymethyl group, an ethoxyethyl group, an ethoxypropyl group, a methoxybutyl group, a propoxymethyl group, etc.), an aryloxyalkyl group (e.g., a phenoxymethyl group, a phenoxyethyl group, a naphthoxymethyl group, a phenoxypentyl group, etc.), a hydroxyalkyl group (e.g., a hydroxymethyl group, a hydroxyethyl group, a hydroxypropyl group, a hydroxyoctyl group, etc.), an aralkyl group (e.g., a benzyl group, a phenethyl group, an ω,ω-diphenylalkyl group, etc.), a cyanoalkyl group (e.g., a cyanomethyl group, a cyanoethyl group, a cyanopropyl group, a cyanobutyl group, etc.), and a haloalkyl group (e.g., a chloromethyl group, a bromomethyl group, a chloroethyl group, a bromopentyl group, a chlorooctyl group, etc.).

The substituents for the substituted phenyl group for $R^{12}$ or $R^{13}$ include an alkyl group having from 1 to 12 carbon atoms (e.g., a methyl group, an ethyl group, a straight chain or branched propyl, butyl, pentyl, or hexyl group, etc.), an alkoxy group having from 1 to 4 carbon atoms (e.g., a methoxy group, an ethoxy group, a propoxy group, a butoxy group, etc.), an aryloxy group having 6 or 7 carbon atoms (e.g., a phenoxy group, an o-, m-, or p-tolyloxy group, etc.), an acyl group having from 2 to 8 carbon atoms (e.g., an acetyl group, a propionyl group, a benzoyl group, an o-, m-, or p-toluoyl group, etc.), an alkoxycarbonyl group having from 2 to 5 carbon atoms (e.g., a methoxycarbonyl group, an ethoxycarbonyl group, a propoxycarbonyl group, a butoxycarbonyl group, etc.), a halogen atom (e.g., a chlorine atom, a bromine atom, a fluorine atom, etc.), a monoalkylamino group having from 1 to 4 carbon atoms in the alkyl moiety thereof (e.g., a methylamino group, an ethylamino group, a butylamino group, etc.), a dialkylamino group having from 1 to 4 carbon atoms in the alkyl moiety thereof (e.g., a dimethylamino group, a diethylamino group, a dipropylamino group, a dibutylamino group, an N-methyl-N-ethylamino group, etc.), an amido group having from 2 to 4 carbon atoms (e.g., an acetamido group, a propionamido group, etc.), and a nitro group.

Examples of the heterocyclic ring formed by $R^{12}$ and $R^{13}$ include a pyrrolidino ring, a morpholino ring, an N-methylpiperazino ring, a julolidino ring, etc.

$R^{16}$, $R^{17}$, $R^{18}$, and $R^{19}$ each specifically represents a hydrogen atom and an alkyl group having from 1 to 12 carbon atoms, such as a methyl group, an ethyl group, a propyl group, an isobutyl group, a t-butyl group, an octyl group, etc., or a halogen atom, e.g., a fluorine atom, a bromine atom, and an iodine atom.

Ar preferably represents a phenyl group having a substituted amino group, and more preferably a p-dimethylaminophenyl group, a p-diethylaminophenyl group, a p-diphenylaminophenyl group, a p-(N-methyl-N-phenyl)aminophenyl group, or a p-(N-ethyl-N-phenyl)aminophenyl group.

The alkyl group for $R^{16}$, $R^{17}$, $R^{18}$, or $R^{19}$ preferably contains from 1 to 4 carbon atoms.

Typical examples of the compounds represented by formula (I) are indicated below:

TABLE 1

| Compound No. | $Z^1$ | $B^1=B^2=B^3$ | Cp |
|---|---|---|---|
| A-1 | S | H | (naphthol with CONH-phenyl) |
| A-2 | S | H | (naphthol with CONH-(2-methylphenyl)) |
| A-3 | S | H | (naphthol with CONH-(2-methoxyphenyl)) |

TABLE 1-continued
| Compound No. | $Z^1$ | $B^1=B^2=B^3$ | Cp |
|---|---|---|---|
| A-4 | S | H | 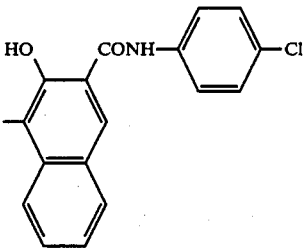 |
| A-5 | S | H | 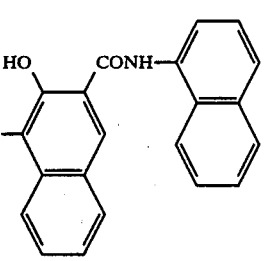 |
| A-6 | S | H | 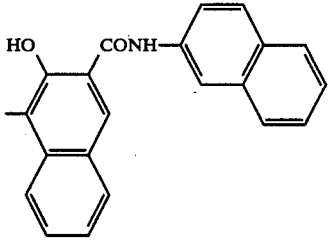 |
| A-7 | S | H | 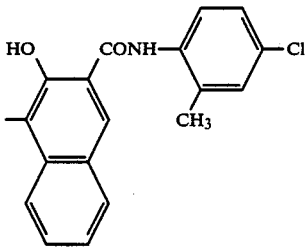 |
| A-8 | S | H | 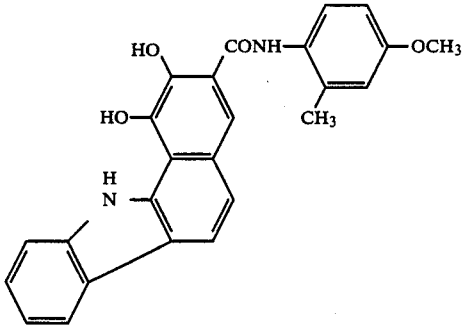 |

TABLE 1-continued

| Compound No. | $Z^1$ | $B^1=B^2=B^3$ | Cp |
|---|---|---|---|
| A-9 | S | H | 4-chlorophenyl-substituted 6-hydroxy-1H-benzo[de]isoquinoline-1,3(2H)-dione |
| A-10 | S | H | 4-hydroxy-3-methyl-N-ethyl naphthalene-1,8-dicarboximide |
| A-11 | S | H | 3-methyl-4-methyl-5-hydroxy-1-(4-chlorophenyl)pyrazole |
| A-12 | S | H | 2-hydroxy-1-methyl-8-(benzoylamino)naphthalene |
| A-13 | S | H | 3-hydroxy-4-methyl-N-(4-trifluoromethylphenyl)-2-naphthamide |
| A-14 | S | H | 3-hydroxy-4-methyl-N-(2-trifluoromethylphenyl)-2-naphthamide |

TABLE 1-continued
| Compound No. | $Z^1$ | $B^1=B^2=B^3$ | Cp |
|---|---|---|---|
| A-15 | S | H | 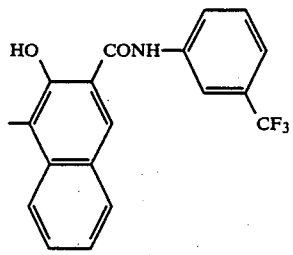 |
| A-16 | S | H | 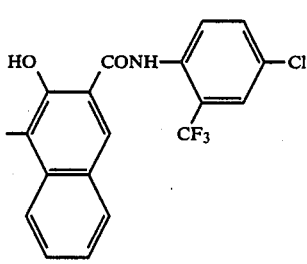 |
| A-17 | S | H | 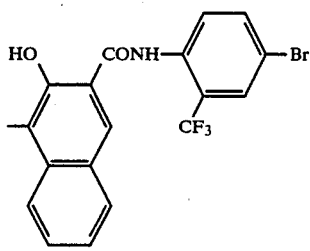 |
| A-18 | S | H | 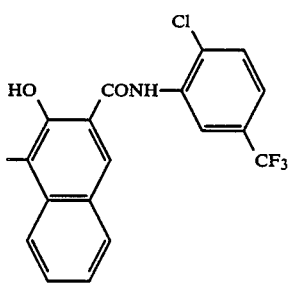 |
| A-19 | S | H | 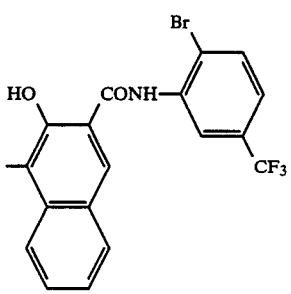 |

TABLE 1-continued

| Compound No. | $Z^1$ | $B^1=B^2=B^3$ | Cp |
|---|---|---|---|
| A-20 | S | H | 3-hydroxy-4-methyl-N-(4-chloro-3-trifluoromethylphenyl)-2-naphthamide |
| A-21 | S | H | 3-hydroxy-4-methyl-N-(3,5-bis(trifluoromethyl)phenyl)-2-naphthamide |
| A-22 | O | H | 3-hydroxy-4-methyl-N-phenyl-2-naphthamide |
| A-23 | O | H | 3-hydroxy-4-methyl-N-(2-methylphenyl)-2-naphthamide |
| A-24 | O | H | 3-hydroxy-4-methyl-N-(4-methoxyphenyl)-2-naphthamide |

TABLE 1-continued

| Compound No. | $Z^1$ | $B^1=B^2=B^3$ | Cp |
|---|---|---|---|
| A-25 | O | H | 3-hydroxy-4-methyl-N-(3-nitrophenyl)-2-naphthamide |
| A-26 | O | H | 3-hydroxy-4-methyl-N-(3-chlorophenyl)-2-naphthamide |
| A-27 | O | H | 3-hydroxy-4-methyl-N-(2-naphthyl)-2-naphthamide |
| A-28 | O | H | 3-hydroxy-4-methyl-N-(4-chloro-2-methylphenyl)-2-naphthamide |
| A-29 | O | H | (see structure) |

TABLE 1-continued
| Compound No. | $Z^1$ | $B^1=B^2=B^3$ | Cp |
|---|---|---|---|
| A-30 | O | H | 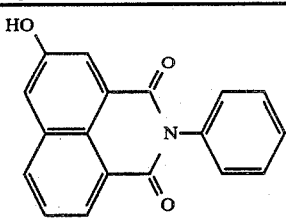 |
| A-31 | O | S | 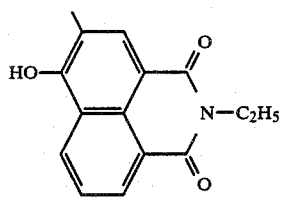 |
| A-32 | O | H | 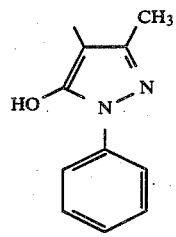 |
| A-33 | O | H | 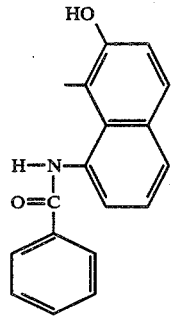 |
| A-34 | O | H | 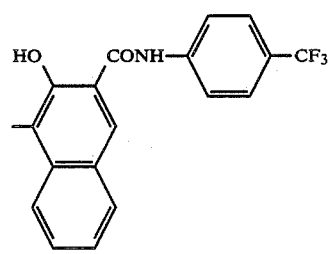 |
| A-35 | O | H | 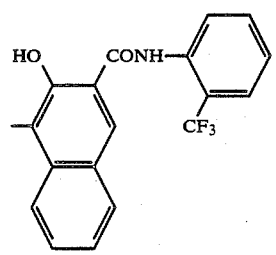 |

TABLE 1-continued

| Compound No. | $Z^1$ | $B^1=B^2=B^3$ | Cp |
|---|---|---|---|
| A-36 | O | H | 3-hydroxy-4-methyl-N-(3-trifluoromethylphenyl)-2-naphthamide |
| A-37 | O | H | 3-hydroxy-4-methyl-N-(4-chloro-2-trifluoromethylphenyl)-2-naphthamide |
| A-38 | O | H | 3-hydroxy-4-methyl-N-(4-bromo-2-trifluoromethylphenyl)-2-naphthamide |
| A-39 | O | H | 3-hydroxy-4-methyl-N-(2-chloro-5-trifluoromethylphenyl)-2-naphthamide |
| A-40 | O | H | 3-hydroxy-4-methyl-N-(2-bromo-5-trifluoromethylphenyl)-2-naphthamide |

TABLE 1-continued

| Compound No. | $Z^1$ | $B^1=B^2=B^3$ | Cp |
|---|---|---|---|
| A-41 | O | H | 3-hydroxy-4-methyl-2-naphthoic acid (4-chloro-3-trifluoromethyl)anilide |
| A-42 | O | Cl (o-position to azo group) | 3-hydroxy-4-methyl-2-naphthoic acid (4-chloro)anilide |
| A-43 | O | Cl (o-position to azo group) | 6-hydroxy-5-methyl-N-phenyl-1H-benz[de]isoquinoline-1,3(2H)-dione |
| A-44 | Se | H | 3-hydroxy-4-methyl-2-naphthoic acid (4-trifluoromethyl)anilide |
| A-45 | Se | H | 3-hydroxy-2-anthracenecarboxylic acid (2-methyl)anilide |

TABLE 1-continued
| Compound No. | $Z^1$ | $B^1=B^2=B^3$ | Cp |
|---|---|---|---|
| A-46 | N—CH₃ (NH) | H | |
| A-47 | N—CH₃ (NH) | H | |
(structures in Cp column shown in images)
Typical examples of the charge transporting materials represented by formulae (II) to (VI) are set forth below.
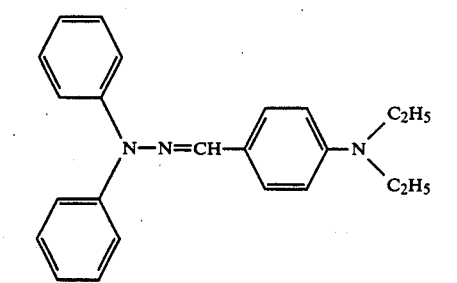
B-1
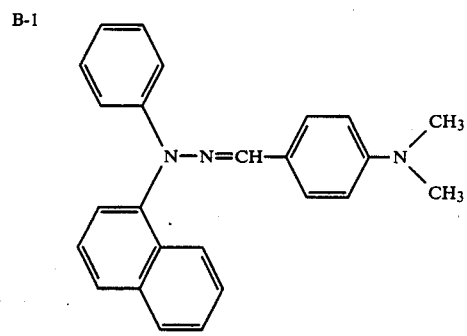
B-2
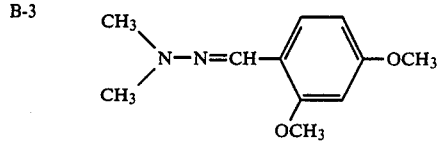
B-3 / B-4
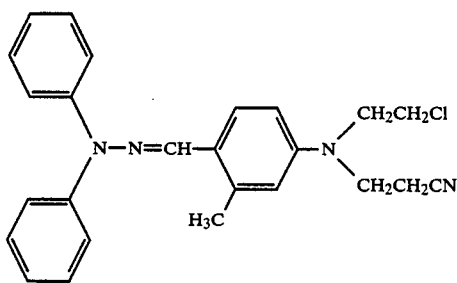
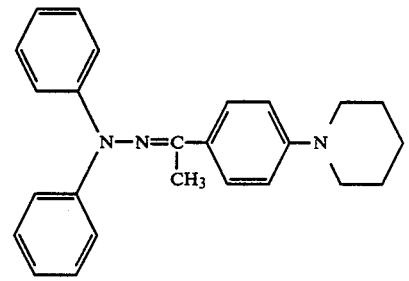
B-5
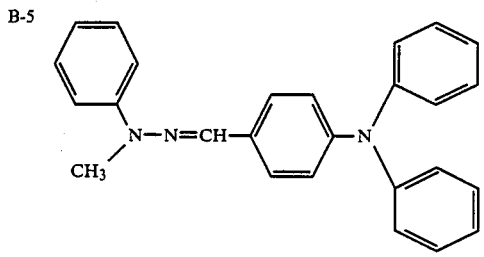
B-6

-continued
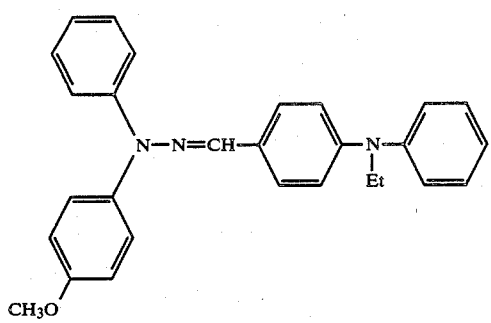 B-7
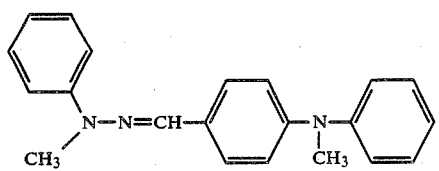 B-8
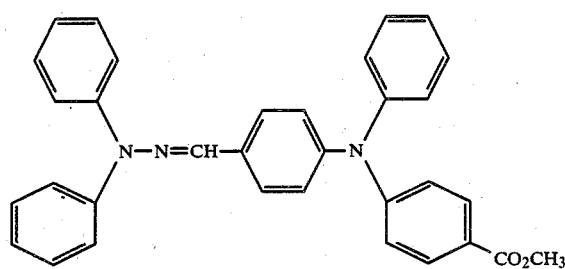 B-9
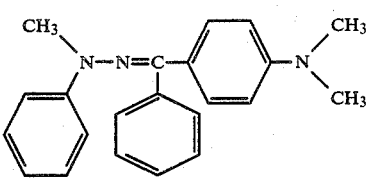 B-10
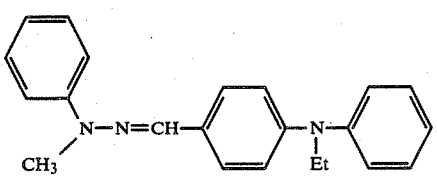 B-11
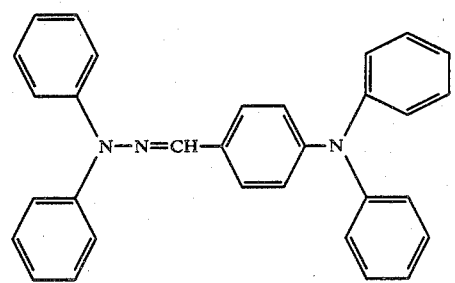 B-12
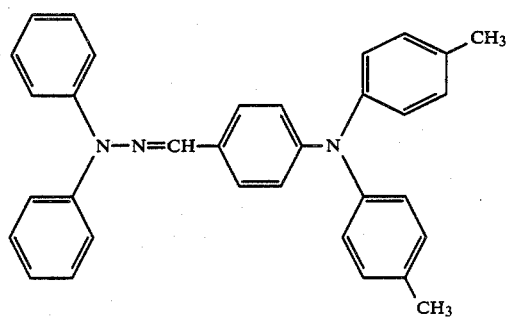 B-13
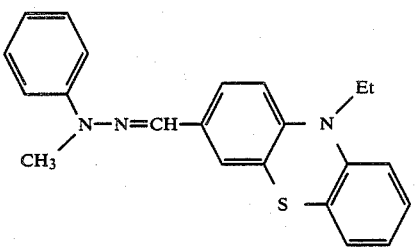 B-14
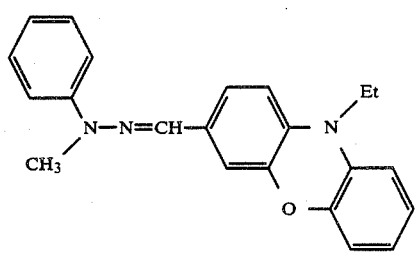 B-15
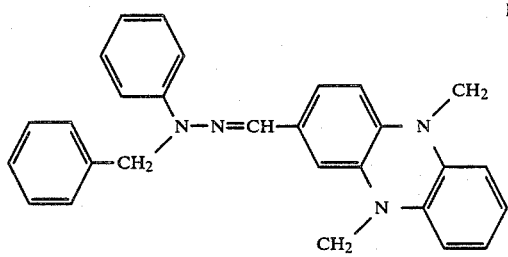 B-16

-continued
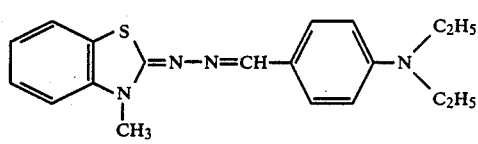
B-17
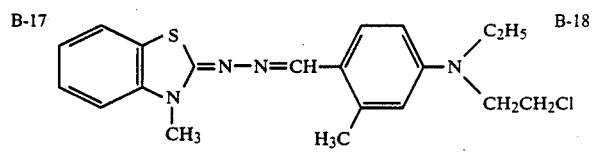
B-18
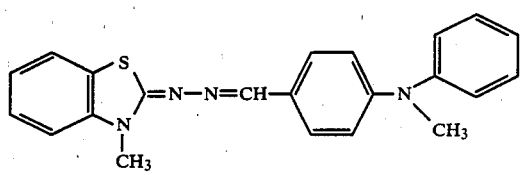
B-19
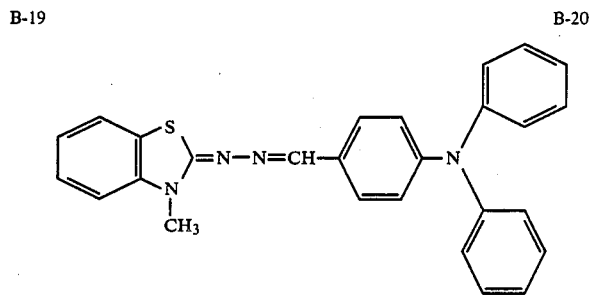
B-20
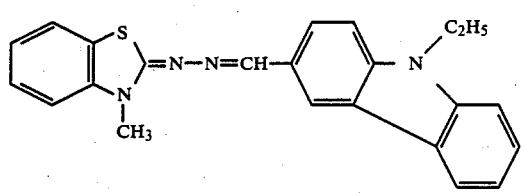
B-21
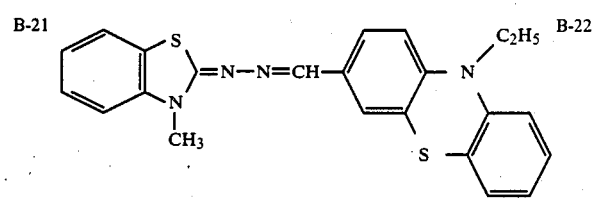
B-22
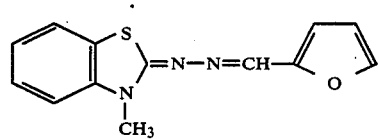
B-23
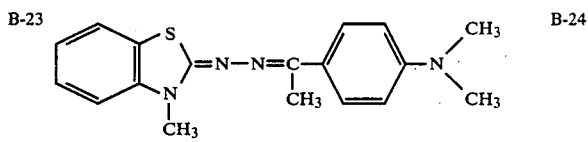
B-24
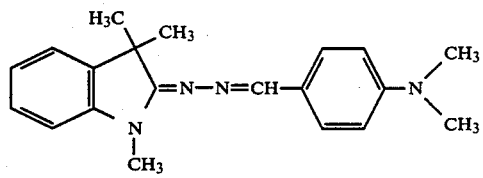
B-25
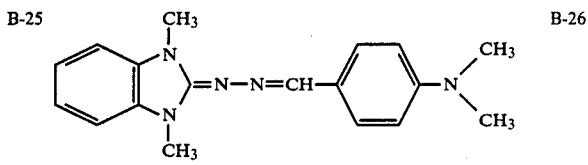
B-26
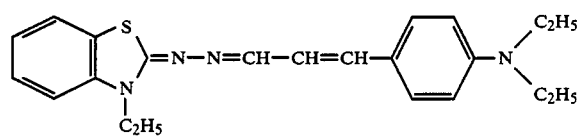
B-27
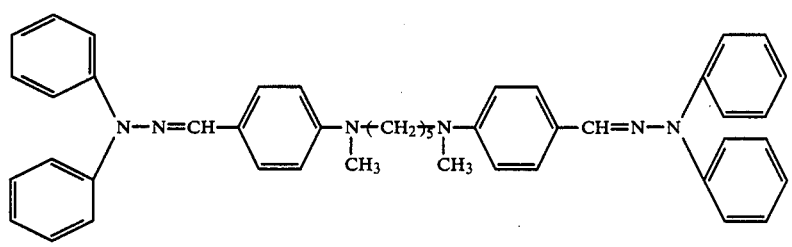
B-28

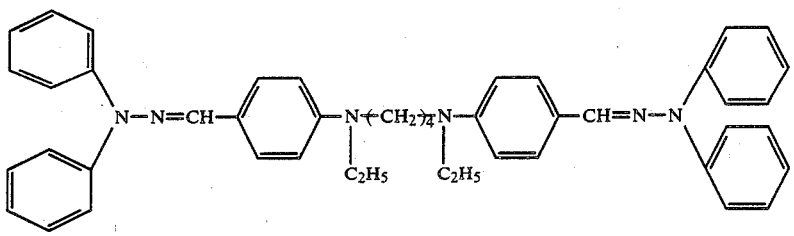
B-29
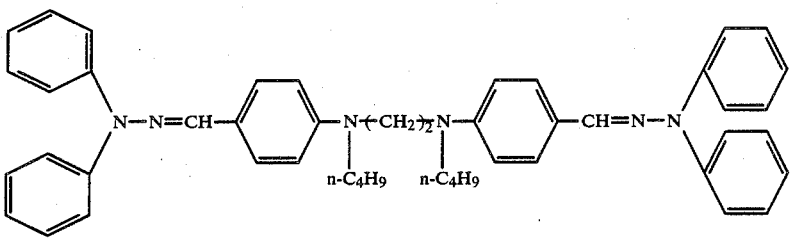
B-30
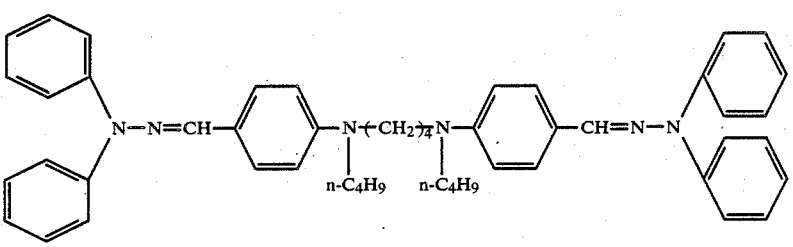
B-31
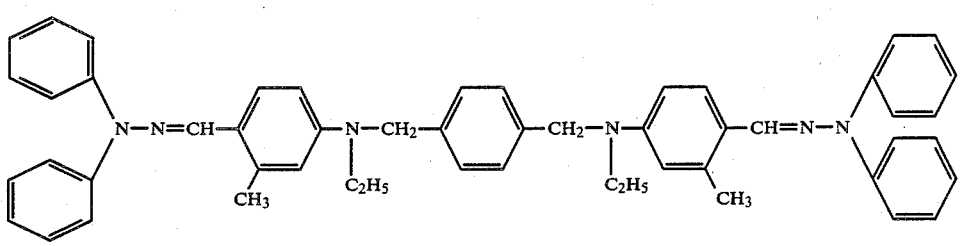
B-32
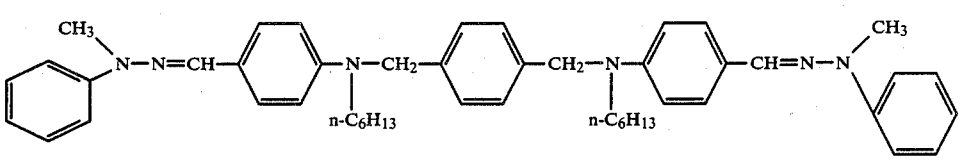
B-33
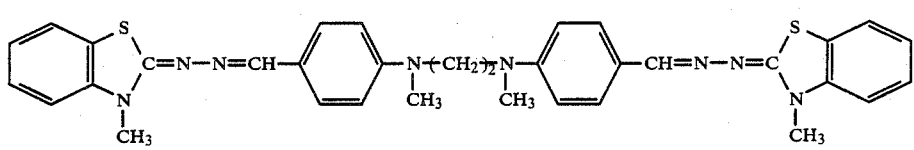
B-34
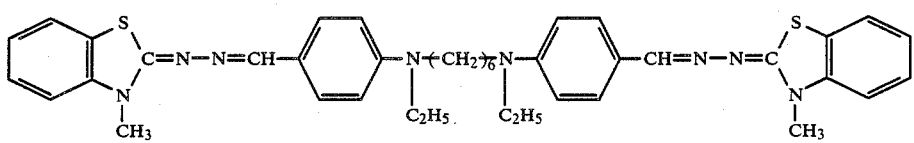
B-35

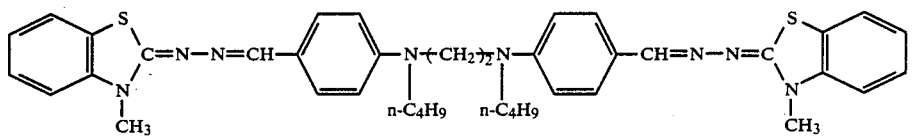

B-36

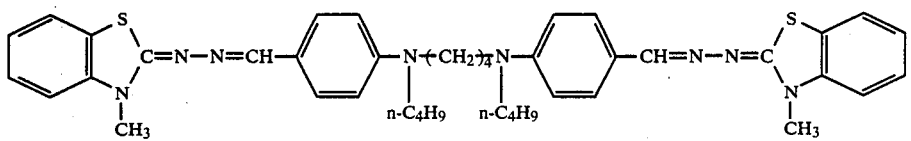

B-37

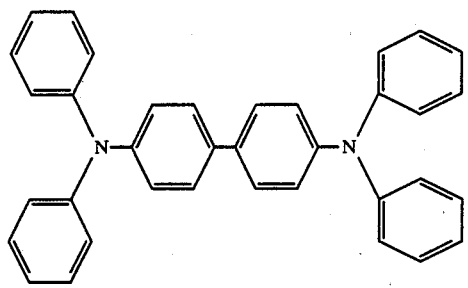

B-38

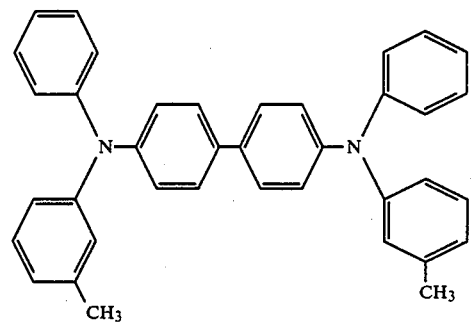

B-39

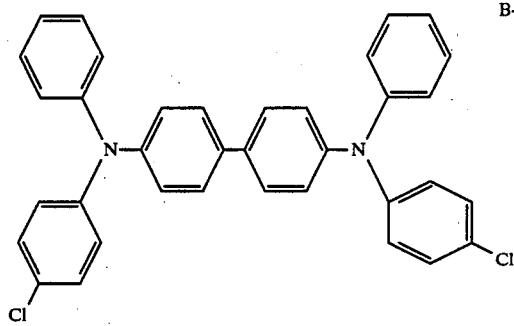

B-40

The electrophotographic photoreceptor in accordance with the present invention comprises a conductive support having provided thereon an electrophotographic light-sensitive layer containing the trisazo compound of formula (I) as a charge generating material and at least one of the compounds of formulae (II) to (VI). The photoreceptor of the present invention may be applied to any of the various known types of electrophotographic photoreceptors, but typically has (1) a structure comprising a conductive support having provided thereon an electrophotographic light-sensitive layer comprising a charge transporting medium having dispersed therein the trisazo compound, or (2) a structure comprising a conductive support having provided thereon a charge generating layer comprising mainly the trisazo compound and further provided thereon a charge transporting medium layer.

The trisazo compound according to the present invention acts as a photoconductive material, and generates large carriers at an extremely high efficiency upon light absorption. The generated charge carrier may be transported using the trisazo compound as a medium, but it is more effective to transport the charge carrier using a charge transporting compound as a medium.

The photoreceptors of type (1) above can be produced by dispersing fine particles of the trisazo compound in a solution containing a charge transporting compoumd and a binder, and coating the dispersion on a conductive support, followed by drying. In this case, the light-sensitive layer has a thickness of from 3 to 30 μm, and preferably from 5 to 20 μm.

For the production of the photoreceptors of type (2) above, a charge generating layer is first formed by vacuum-evaporating the trisazo compound onto a conductive support, or coating the support with a solution of the trisazo compound in a solvent, such as amines, or a dispersion of fine particles of the trisazo compound in an appropriate solvent containing, if desired, a binder, followed by drying. A charge transporting layer is then formed thereon by coating a solution containing the charge transporting compound and a binder, followed by drying. In this case, the charge generating layer containing the trisazo compound preferably has a thickness of not more than 4 μm, and more preferably not more than 2 μm, and the charge transporting layer preferably has a thickness of from 3 to 30 μm, and more preferably from 5 to 20 μm.

The trisazo compound to be used in the production of the photoreceptors of both types (1) and (2) is ground in a dispersing mchine, e.g., a ball mill, a sand mill, a vibration mill, etc., to a particle size preferably not greater than 5 μm, and more preferably not greater than 2 μm.

In the electrophotographic photoreceptors of type (1), the weight ratio of the trisazo compound to the binder in the light-sensitive layer ranges from 0.01/1 to 2/1, and preferably from 0.05/1 to 1/1. A very small ratio of the trisazo compound does not bring about a satisfactory sensitivity, whereas a very large ratio deteriorates charging properties or weakens strength of the light-sensitive layer. The weight ratio of the charge transporting compound to the binder preferably ranges from 0.1/1 to 2/1, and more preferably from 0.3/1 to 1.3/1.

In the electrophotographic photoreceptors of type (2), the weight ratio of the trisazo compound to the binder in the charge generating layer preferably ranges from 0.1/1 to 50/1. With smaller weight ratios, sufficient photosensitivity cannot be obtained. The weight ratio of the charge transporting compound to the binder in the charge transporting layer ranges from 0.01/1 to 10/1, and preferably from 0.2/1 to 2.0/1.

The charge generating layer according to type (2) may further contains a charge transporting compound, such as hydrazone compounds, oxime compounds, etc., as disclosed in Japanese Patent Application (OPI) Nos. 196767/85, 254045/85, and 262159/85.

In the production of the photoreceptors of the invention, additives, such as plasticizers, sensitizers, etc., can be used in combination with the binder.

The conductive support which can be used in the present invention includes metal sheets, e.g., aluminum, copper, zinc, etc.; plastic sheets, e.g., polyesters, etc.; plastic sheets having deposited thereon a conductive material, e.g., aluminum, silicon dioxide, etc., or coated thereon a dispersion of such a conductive material; paper having been rendered conductive, and the like.

Binders which can be used in this invention preferably include hydrophobic, highly dielectric and electrically insulating film-forming high polymers. Typical but non-limiting examples of such high polymers are polycarbonate, polyester, methacrylic resins, acrylic resins, polyvinyl chloride, polyvinylidene chloride, polystyrene, polyvinyl acetate, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone-alkyd resin, a phenolformaldehyde resin, a styrene-alkyd resin and poly-N-vinylcarbazole. These binders can be used either individually or in combination of two or more thereof.

The plasticizers which can be used in this invention include biphenyl, biphenyl chloride, o-terphenyl, p-terphenyl, dibutyl phthalate, dimethyl glycol phthalate, dioctyl phthalate, triphenyl phosphate, methylnaphthalene, benzophenone, chlorinated paraffin, polypropylene, polystyrene, dilauryl thiodipropionate, 3,5-dinitrosalicylic acid, and various fluorohydrocarbons.

The sensitizers which can be used in this invention include chloranil, tetracyanoethylene, Methyl Violet, Rhodamine B, cyanine dyes, merocyanine dyes, pyrylium dyes, thiapyrylium dyes, and the like.

In addition, silicone oil, etc., may be added to improve surface properties of the electrophotographic photoreceptors.

The photoreceptors of the present invention can have an adhesive layer or a barrier layer between the conductive support and the light-sensitive layer, if desired. Materials to be used for these layers include the high polymers as recited above for the binder as well as gelatin, casein, polyvinyl alcohol, ethyl cellulose, carboxymethyl cellulose, vinylidene chloride polymer latices described in Japanese Patent Application (OPI) No. 84247/84, styrene-butadiene polymer latices described in Japanese Patent Application (OPI) No. 114544/84, and aluminum oxide. These layers preferably have a thickness of from 0.1 to 5 $\mu$m.

The electrophotographic photoreceptors as hereinabove illustrated are generally characterized by high sensitivity and excellent durability, and can be applied widely as photoreceptors for electrophotographic copying machines, printers using a laser beam or a Braun tube as a light source, and the like.

Photoconductive compositions containing the trisazo compound according to the present invention can be used as a photoconductive layer in video camera tubes or as a photoconductive layer in the known solid camera elements which have a light receiving layer (photoconductive layer) provided on the whole face of a semiconductor circuit arranged one- or two-dimensionally so as to carry out signal transfer or scanning. Further, they can be used as a photoconductive layer in solar cells as described in A. K. Ghosh, et al., *J. Appl. Phys.*, Vol. 49 (12), p. 5984 (1978).

Furthermore, printing plates can be produced by dispersing the charge generating material of formula (I) and the charge transporting material of formulae (II) to (VI) in an alkali-soluble resin solution, e.g., a phenolic resin solution, coating the dispersion on a conductive support, e.g., aluminum, followed by drying, imagewise exposing the coating film to light, developing the latent image with a toner and subjecting the plate to etching with an alkali aqueous solution. The thus produced printing plate has a high resolving power, high printing durability and high sensitivity. Printed circuits can also be produced likewise.

This invention will now be illustrated in greater detail with reference to the following examples, but it should be understood that the present invention is not limited thereto. In these examples, all the parts are given by weight.

EXAMPLE 1

Five parts of Compound A-1 and a solution of 10 parts of a polyester resin (Vylon 200, produced by Toyo Spinning Co., Ltd.) in 44 parts of tetrahydrofuran were dispersed in a ball mill for 20 hours. The dispersion was coated on a conductive support comprising a 75 $\mu$m thick polyethylene terephthalate film having an aluminum deposited film (surface resistivity: $10^3$ $\Omega$) using a wire round rod and dried to form a charge generating layer having a thickness of 1 $\mu$m.

A solution of 4 parts of Compound B-6 and 4 parts of bisphenol A polycarbonate in a mixed solvent of 13.3 parts of dichloromethane and 26.6 parts of 1,2-dichloroethane was coated on the charge generating layer using a wire round rod and dried to form a charge transporting layer having a thickness of 11 $\mu$m, to thereby obtain an electrophotographic photoreceptor having a two-layered light-sensitive layer.

The resulting photoreceptor was charged to a potential of $-700$ V by corona discharge of $-6$ KV by the use of an electrostatic copying paper testing equipment (SP-428, manufactured by Kawaguchi Denki K. K.) and exposed to light emitted from a tungsten lamp (color temperature: 3,000° K.) at an illuminance of 2 lux. The time required for the surface potential to be reduced to one-half its initial value, i.e., the half-decay, was determined to obtain a half-decay exposure amount ($E_{50}$: lux·sec). As a result, the half-decay exposure amount was 1.7 lux·sec.

After the above-described charging and light exposure processing was repeated 3,000 times, $E_{50}$ underwent no substantial change.

EXAMPLES 2 TO 56

An electrophotographic photoreceptor was produced in the same manner as described in Example 1, except replacing trisazo Compound A-1 with the compound shown in Table 2, and replacing charge transporting compound, Compound B-6, with the compound shown in Table 2. The results obtained are also shown in Table 2.

TABLE 2

| Example No. | Trisazo Compound | Charge Transporting Compound | $E_{50}$ (lux · sec) |
| --- | --- | --- | --- |
| 2 | A-4 | B-12 | 1.3 |
| 3 | A-6 | B-12 | 3.4 |
| 4 | A-8 | B-12 | 1.8 |
| 5 | A-10 | B-12 | 1.7 |
| 6 | A-14 | B-12 | 1.6 |
| 7 | A-16 | B-12 | 1.8 |
| 8 | A-18 | B-12 | 1.8 |
| 9 | A-23 | B-12 | 2.3 |
| 10 | A-25 | B-12 | 2.0 |
| 11 | A-30 | B-12 | 3.6 |
| 12 | A-34 | B-12 | 1.6 |
| 13 | A-35 | B-12 | 3.6 |
| 14 | A-36 | B-12 | 1.8 |
| 15 | A-38 | B-12 | 2.8 |
| 16 | A-39 | B-12 | 1.6 |
| 17 | A-40 | B-12 | 1.9 |
| 18 | A-41 | B-12 | 1.8 |
| 19 | A-44 | B-12 | 1.9 |
| 20 | A-46 | B-12 | 2.0 |
| 21 | A-4 | B-1 | 1.3 |
| 22 | A-4 | B-2 | 1.5 |
| 23 | A-4 | B-6 | 1.4 |
| 24 | A-4 | B-13 | 1.5 |
| 25 | A-4 | B-36 | 1.2 |
| 26 | A-4 | B-39 | 1.7 |
| 27 | A-15 | B-3 | 1.6 |
| 28 | A-15 | B-5 | 1.7 |
| 29 | A-15 | B-19 | 1.4 |
| 30 | A-15 | B-20 | 1.4 |
| 31 | A-15 | B-28 | 1.2 |
| 32 | A-15 | B-29 | 1.1 |
| 33 | A-16 | B-1 | 1.5 |
| 34 | A-16 | B-17 | 1.4 |
| 35 | A-16 | B-19 | 1.4 |
| 36 | A-16 | B-20 | 1.4 |
| 37 | A-16 | B-30 | 1.5 |
| 38 | A-16 | B-31 | 1.5 |
| 39 | A-31 | B-6 | 1.8 |
| 40 | A-31 | B-8 | 2.0 |
| 41 | A-31 | B-11 | 1.9 |
| 42 | A-31 | B-13 | 1.3 |
| 43 | A-31 | B-14 | 1.2 |
| 44 | A-31 | B-18 | 1.6 |
| 45 | A-36 | B-17 | 1.6 |
| 46 | A-36 | B-19 | 1.5 |
| 47 | A-36 | B-21 | 1.4 |
| 48 | A-36 | B-22 | 1.5 |
| 49 | A-36 | B-25 | 1.4 |
| 50 | A-36 | B-40 | 1.9 |
| 51 | A-40 | B-19 | 1.7 |
| 52 | A-40 | B-20 | 1.8 |
| 53 | A-40 | B-28 | 1.1 |
| 54 | A-40 | B-31 | 1.2 |
| 55 | A-40 | B-37 | 1.2 |
| 56 | A-40 | B-39 | 1.8 |

It can be seen from the results of Table 2 that the electrophotographic photoreceptors according to the present invention exhibit high sensitivity.

COMPARATIVE EXAMPLES 1 TO 3

An electrophotographic photoreceptor was produced in the same manner as in Example 1 but replacing Compound B-6 with each of the following comparative compounds (C-1, C-2, and C-3). A half-decay exposure amount ($E_{50}$) was determined, and the results obtained are shown in Table 3.

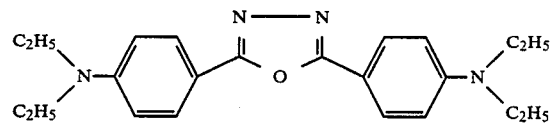

C-1

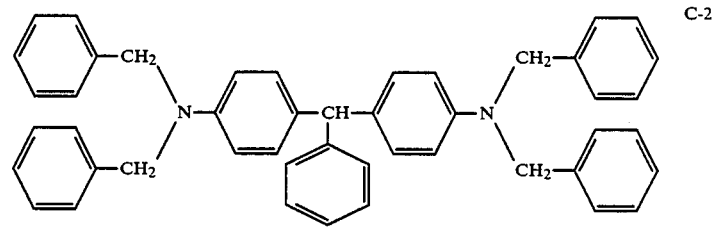

C-2

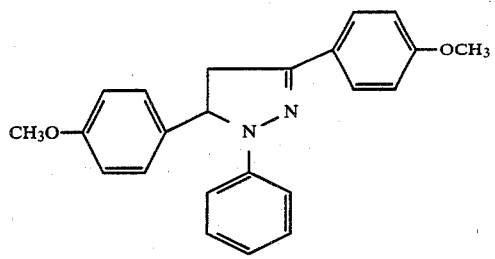

C-3

TABLE 3

| Comparative Example No. | Trisazo Compound | Charge Transporting Compound | $E_{50}$ (lux · sec) |
| --- | --- | --- | --- |
| 1 | A-1 | C-1 | 10.5 |
| 2 | A-1 | C-2 | 13.4 |
| 3 | A-1 | C-3 | 16.1 |

It can be seen from Table 3 combined with Table 2 that the electrophotographic photoreceptors in which the trisazo compound of formula (I) is combined with the compound of formulae (II) to (VI) exhibit heightened sensitivity.

EXAMPLE 57

One part of Compound A-1, 5 parts of Compound B-6, and 5 parts of a polyester resin (Vylon 200, produced by Toyo Spinning Co., Ltd.) were added to 95 parts of dichloromethane, and the mixture was ground and mixed in a ball mill to prepare a coating composition. The coating composition was coated on a transparent conductive support comprising a 100 μm thick polyethylene terephthalate film having an indium oxide deposited film (surface resistivity: $10^3$ Ω) and dried to produce an electrophotographic photoreceptor having a 9 μm thick single-layer light-sensitive layer.

The resulting photoreceptor was charged by corona discharge of +5 KV so as to have a surface potential of +450 V by the use of an electrostatic copying paper testing equipment (SP-428, manufactured by Kawaguchi Denki K. K.) and then exposed to light emitted from a tungsten lamp (color temperature: 3,000° K.) at an illuminance of 2 lux. The half-decay exposure amount $E_{50}$ was found to be 2.6 lux·sec. This $E_{50}$ value did not substantially change even after repetition of the charging and exposure processing 3,000 times.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising a conductive support having provided thereon a light-sensitive layer, wherein said light-sensitive layer contains as a charge generating material a trisazo compound represented by formula (I)

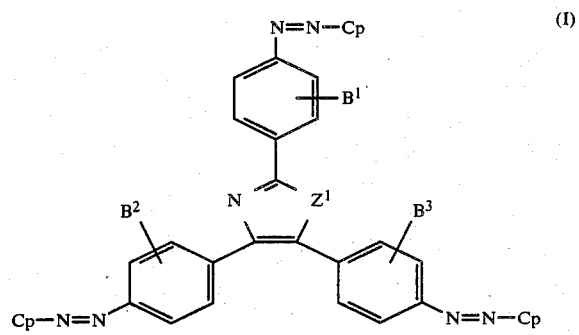

wherein Cp represents a coupler residue; $Z^1$ represents $$-\underset{R^6}{N}-,$$

—O—, —S—, or —Se—, wherein $R^6$ represents a hydrogen atom, a substituted or unsubstituted lower alkyl group, a substituted or unsubstituted aryl group, a substituted or unsubstituted alkoxycarbonyl group, a substituted or unsubstituted aryloxycarbonyl group, or a substituted or unsubstituted acyl group; and $B^1$, $B^2$, and $B^3$ each represents a hydrogen atom, a halogen atom, a substituted or unsubstituted lower alkyl group, a substituted or unsubstituted lower alkoxy group, a substituted or unsubstituted lower alkoxycarbonyl group, a substituted or unsubstituted aryl group, a substituted or unsubstituted aryloxy group, or a substituted or unsubstituted aryloxycarbonyl group; and contains as a charge transporting material at least one compound represented by one of formulae (II) to (VI)

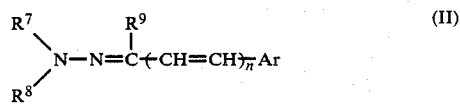

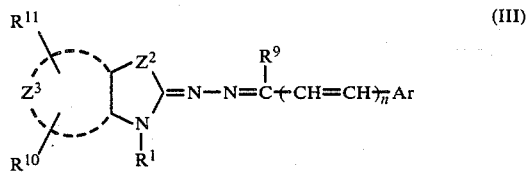

-continued

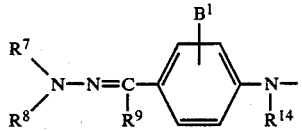
(IV)

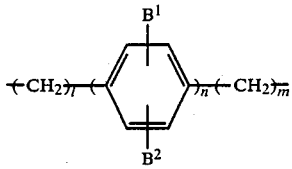
(V)

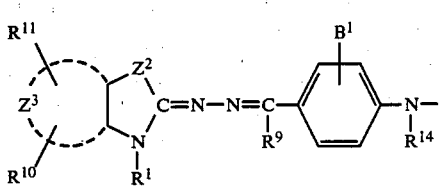

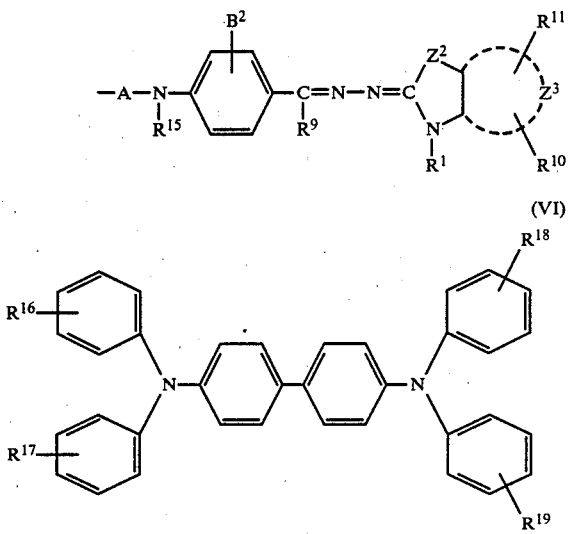
(VI)

wherein R$^7$, R$^8$, R$^{14}$, and R$^{15}$ each represents a substituted or unsubstituted alkyl group, a substituted or unsubstituted aralkyl group, or a substituted or unsubstituted aryl group; or R$^7$ and R$^8$ together form a heterocyclic ring, or R$^{14}$ and R$^{15}$ together form an N-containing heterocyclic ring; R$^9$ represents a hydrogen atom, a substituted or unsubstituted alkyl group, or a substituted or unsubstituted aryl group; B$^1$ and B$^2$ are the same as defined above; R$^1$ represents a substituted or unsubstituted alkyl group, or a substituted or unsubstituted phenyl group; R$^{10}$ and R$^{11}$ each represents a hydrogen atom, a halogen atom, a substituted or unsubstituted alkyl group, a substituted or unsubstituted aryl group, a substituted or unsubstituted alkoxy group, a substituted or unsubstituted aralkoxy group, or a substituted or unsubstituted amino group; R$^{16}$, R$^{17}$, R$^{18}$, and R$^{19}$ each represents a hydrogen atom, a halogen atom, or an alkyl group; Ar represents a substituted or unsubstituted aryl group, or a substituted or unsubstituted heterocyclic group; Z$^2$ represents $$-\underset{R^6}{N}-,$$

—O—, —S—, —Se—, or a substituted or unsubstituted methine group; Z$^3$ represents an atomic group forming a benzene ring or a naphthalene ring; n represents 0 or 1; and A represents a group of the formula

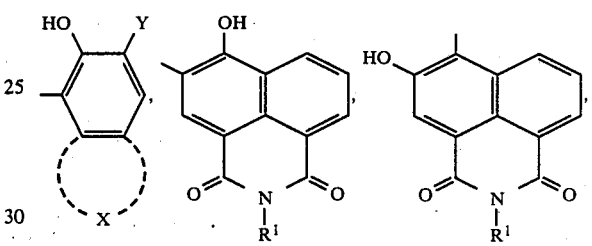

wherein l and m represent 0 or an integer of from 1 to 6; n represents 0 or 1; and B$^1$ and B$^2$ are the same as defined above, or B$^1$ and B$^2$ together form a condensed polycyclic aromatic ring.

2. An electrophotographic photoreceptor as in claim 1, wherein Cp in formula (I) is selected from coupler residues represented by the formulae

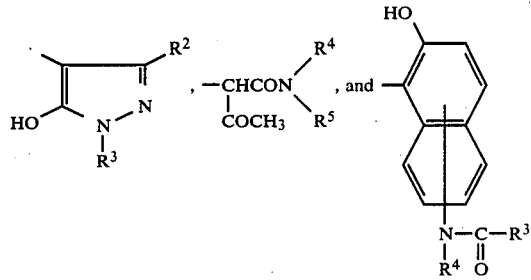

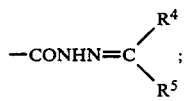

wherein X represents an atomic group forming a substituted or unsubstituted aromatic or heterocyclic ring which is condensed to the benzene ring; Y represents a hydrogen atom, —CONR$^4$R$^5$, —COOR$^4$, —CONHNR$^4$R$^5$, —CONHN=CH—R$^4$, or $$-CONHN=C\begin{matrix}R^4\\R^5\end{matrix};$$

R$^1$ represents a substituted or unsubstituted alkyl group, or a substituted or unsubstituted phenyl group; R$^2$ represents a hydrogen atom, a lower alkyl group, a carbamoyl group, a carboxyl group, an alkoxycarbonyl group, an aryloxycarbonyl group, or a substituted or unsubstituted amino group; R$^3$ represents a substituted or unsubstituted alkyl group, a substituted or unsubstituted aromatic group, or a substituted or unsubstituted heterocyclic aromatic group; and R$^4$ and R$^5$ each represents a hydrogen atom, a substituted or unsubstituted alkyl group, a substituted or unsubstituted aromatic group, or a substituted or unsubstituted heterocyclic aromatic group, or R$^4$ and R$^5$ in

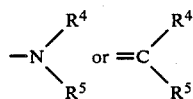

taken together with the adjacent nitrogen or carbon atom form a ring.

3. An electrophotographic photoreceptor as in claim 2, wherein Cp is represented by the formula

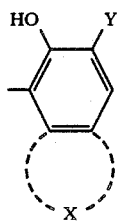

wherein X represents an atomic group forming a benzene ring, a carbazole ring, or a dibenzofuran ring which is condensed to the benzene ring; and Y represents

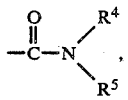

wherein one of $R^4$ and $R^5$ represents a hydrogen atom and the other represents a substituted phenyl group.

4. An electrophotographic photoreceptor as in claim 3, wherein said substituted phenyl group is a phenyl group substituted with a trifluoromethyl group or a phenyl group substituted with a trifluoromethyl group and a halogen atom.

5. An electrophotographic photoreceptor as in claim 1, wherein one of $R^7$ and $R^8$ in formulae (II) and (IV) represents a phenyl group, and the other represents a methyl group, an ethyl group, a benzyl group, a phenyl group, or a naphthyl group.

6. An electrophotographic photoreceptor as in claim 1, wherein Ar in formulae (I) and (II) represents a phenyl group substituted with a substituted amino group.

7. An electrophotographic photoreceptor as in claim 6, wherein said substituted phenyl group is a p-dimethylaminophenyl group, a p-diethylaminophenyl group, a p-diphenylaminophenyl group, a p-(N-methyl-N-phenyl)aminophenyl group, or a p-(N-ethyl-N-phenyl)aminophenyl group.

8. An electrophotographic photoreceptor as in claim 1, wherein the alkyl group as represented by $R^{16}$, $R^{17}$, $R^{18}$, and $R^{19}$ in formula (VI) contains from 1 to 4 carbon atoms.

9. An electrophotographic photoreceptor as in claim 1, wherein said light-sensitive layer comprises a charge transporting medium comprising the charge transporting compound and a binder, said medium having dispersed therein the trisazo compound.

10. An electrophotographic photoreceptor as in claim 9, wherein the weight ratio of the trisazo compound to the binder is from 0.01/1 to 2/1, and the weight ratio of the charge transporting compound to the binder is from 0.1/1 to 2/1.

11. An electrophotographic photoreceptor as in claim 10, wherein the weight ratio of the trisazo compound to the binder is from 0.05/1 to 1/1, and the weight ratio of the charge transporting compound to the binder is from 0.3/1 to 1.3/1.

12. An electrophotographic photoreceptor as in claim 9, wherein said light-sensitive layer has a thickness of from 3 to 30 μm.

13. An electrophotographic photoreceptor as in claim 1, wherein said light-sensitive layer comprises a charge generating layer containing the trisazo compound as a main component and a charge transporting layer containing the charge transporting compound and a binder.

14. An electrophotographic photoreceptor as in claim 13, wherein said charge generating layer further contains a binder, and the weight ratio of the trisazo compound to said binder is from 0.1/1 to 50/1.

15. An electrophotographic photoreceptor as in claim 13, wherein the weight ratio of the charge transporting compound to the binder is from 0.1/1 to 10/1.

16. An electrophotographic photoreceptor as in claim 13, wherein the weight ratio of the charge transporting compound to the binder is from 0.2/1 to 2.0/1.

17. An electrophotographic photoreceptor as in claim 13, wherein said charge generating layer has a thickness of not more than 4 μm, and said charge transporting layer has a thickness of from 3 to 30 μm.

* * * * *